United States Patent
Stepnioski et al.

(12) 
(10) Patent No.: US 11,523,002 B2
(45) Date of Patent: Dec. 6, 2022

(54) DYNAMIC BANDWIDTH SERVICE LIMITS

(71) Applicant: Charter Communications Operating, LLC, St. Louis, MO (US)

(72) Inventors: Lukasz Stepnioski, Castle Pines, CO (US); Daniel P. R. Mattox, Denver, CO (US); Andrzej Jakubowski, Lakewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/778,275

(22) Filed: Jan. 31, 2020

(65) Prior Publication Data
US 2021/0243309 A1     Aug. 5, 2021

(51) Int. Cl.
| | |
|---|---|
| *H04M 15/00* | (2006.01) |
| *H04L 12/14* | (2006.01) |
| *H04L 41/0896* | (2022.01) |
| *H04L 47/80* | (2022.01) |
| *H04L 43/16* | (2022.01) |

(52) U.S. Cl.
CPC ...... *H04M 15/887* (2013.01); *H04L 12/1435* (2013.01); *H04L 41/0896* (2013.01); *H04L 43/16* (2013.01); *H04L 47/80* (2013.01); *H04M 15/58* (2013.01)

(58) Field of Classification Search
CPC . H04M 15/887; H04M 15/58; H04L 12/1435; H04L 41/0896; H04L 12/00; H04L 43/16
See application file for complete search history.

(56) References Cited

U.S. PATENT DOCUMENTS

| | | | |
|---|---|---|---|
| 7,873,074 B1 * | 1/2011 | Boland | H04L 47/823 370/468 |
| 8,144,594 B2 | 3/2012 | Woundy et al. | |
| 8,876,517 B2 | 11/2014 | Tuttle et al. | |
| 10,263,860 B2 | 4/2019 | Woundy et al. | |

(Continued)

OTHER PUBLICATIONS

Cable Television Laboratories, Inc. "Digital Transmission Characterization of Cable Television Systems" Nov. 28, 1994, pp. 1-321.
(Continued)

*Primary Examiner* — Jinsong Hu
*Assistant Examiner* — Farideh Madani
(74) *Attorney, Agent, or Firm* — Armis IP Law, LLC

(57) ABSTRACT

A network services provider delivers bandwidth services to users in relation to a dynamic limit based on an average user consumption, rather than a fixed amount per subscriber. An average user consumption is employed to compute a consumption limit from relative portions of a user community substantially exceed the average, typically defined as "heavy users." Usage levels below the consumption limit have an increased availability up to the consumption limit. The consumption limit may vary from a total capacity of the service infrastructure, which changes, generally in an increasing manner, as additional resources are added to the (Continued)

network. The consumption limits may be defined over different service intervals, such as daily, weekly or monthly, and for different groups of users depending on network layout.

28 Claims, 6 Drawing Sheets

(56) References Cited

U.S. PATENT DOCUMENTS

| | | | | |
|---|---|---|---|---|
| 2012/0147891 | A1* | 6/2012 | Heo | H04L 47/125 |
| | | | | 370/392 |
| 2012/0155296 | A1* | 6/2012 | Kashanian | H04M 15/853 |
| | | | | 370/252 |
| 2013/0196615 | A1* | 8/2013 | Zalmanovitch | H04M 15/7652 |
| | | | | 455/405 |
| 2013/0267196 | A1* | 10/2013 | Leemet | H04M 15/886 |
| | | | | 455/405 |
| 2015/0029864 | A1* | 1/2015 | Raileanu | H04L 45/70 |
| | | | | 370/237 |
| 2017/0163821 | A1* | 6/2017 | Payette | H04M 15/8214 |
| 2018/0184264 | A1* | 6/2018 | Dulick | H04M 15/41 |
| 2018/0249017 | A1* | 8/2018 | Karam | H04M 15/8214 |
| 2019/0260879 | A1* | 8/2019 | Raleigh | H04W 4/24 |

OTHER PUBLICATIONS

Cisco Internet Business Solutions Internet Group, Moving Toward Usage-Based Pricing, A Connected Life Market Watch Perspective, Mar. 2012, pp. 1-59.

Holobinko, et al., "Analysis And Prediction Of Peak Data Rates Through DOCSIS Cores", 2018 Fall Technical Forum, SCTE-ISBE CABLET-EC EXPO, 2018, Atlanta, GA, Oct. 22-25, pp. 1-14.

Hughesnet, Hughesnet Gen5 Fair Access Policy for the 10 GB, 20 GB, 30 GB and 50 GB Service Plans, Dec. 10, 2019, pp. 1-4.

Proactive Network Maintenance, "Solving Problems DOCSIS PNM", Oct. 13, 2013, pp. 1-15.

Understanding Data Throughput in a DOCSIS World, Document ID: 19220, Updated Aug. 25, 2008, pp. 1-19, https://www.cisco.eom/c/en/us/support/docs/broadband-cable/data-over-cable-service-interface-specifications-docsis/19220-data-thruput-docsis-world-19220.html.

* cited by examiner

DYNAMIC BANDWIDTH SERVICE LIMITS

BACKGROUND

Network service providers deliver services, typically media, applications and browsing capability, via bandwidth defined in terms of an amount of data transferred. Users, or subscribers, enter an agreement for an amount of data that may be consumed in a particular periodic interval, such as monthly. Some uses may also have "unlimited" data, however their data/bandwidth usage may still be tracked. Fees are based on the amount of data that may be consumed within the period. While many users consume modest amounts of data, there are typically a small number of users that consume a disproportionate quantity of data. This relatively small group of "heavy" users places burdens on the bandwidth delivery infrastructure that may impact other more moderate users.

BRIEF DESCRIPTION OF EMBODIMENTS

A network services provider delivers broadband services in the form of transmitted bandwidth to users in relation to a dynamic limit based on an average user consumption, rather than a fixed amount per subscriber. An average user consumption is employed to compute a consumption limit based on portions of a user community that substantially exceed the consumption limit, typically defined as "heavy users." Usage levels below the consumption limit have an increased availability up to the consumption limit. The consumption limit may vary from a total capacity of the service infrastructure, which changes, generally in an increasing manner, as additional resources are added to the network. The consumption limits may be defined over different service intervals, such as daily, weekly or monthly, and for different groups of users depending on network layout.

Configurations herein are based, in part, on the observation that a network capacity is often greater than an aggregation each user's limit or quota. Most infrastructure providers are continually adding and upgrading the physical network, so this absolute capacity varies, generally upward. Unfortunately, conventional approaches to bandwidth management are driven by the relative minority of subscribers (users) that consume a disproportionate share of bandwidth. Usage limits are therefore driven by monetary incentives to limit and recover from excessive users, rather than by a physical infrastructure limitation. The remaining users encounter an arbitrary usage limit even though the network has capacity to deliver additional bandwidth. Accordingly, configurations herein substantially overcome the shortcomings of conventional bandwidth quotas by providing a dynamic consumption limit based on an average subscriber usage and a percentage of users consuming a disproportionate share of bandwidth.

Note that any of the resources as discussed herein can include one or more computerized devices, wireless access points, wireless base stations, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different bandwidth based services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
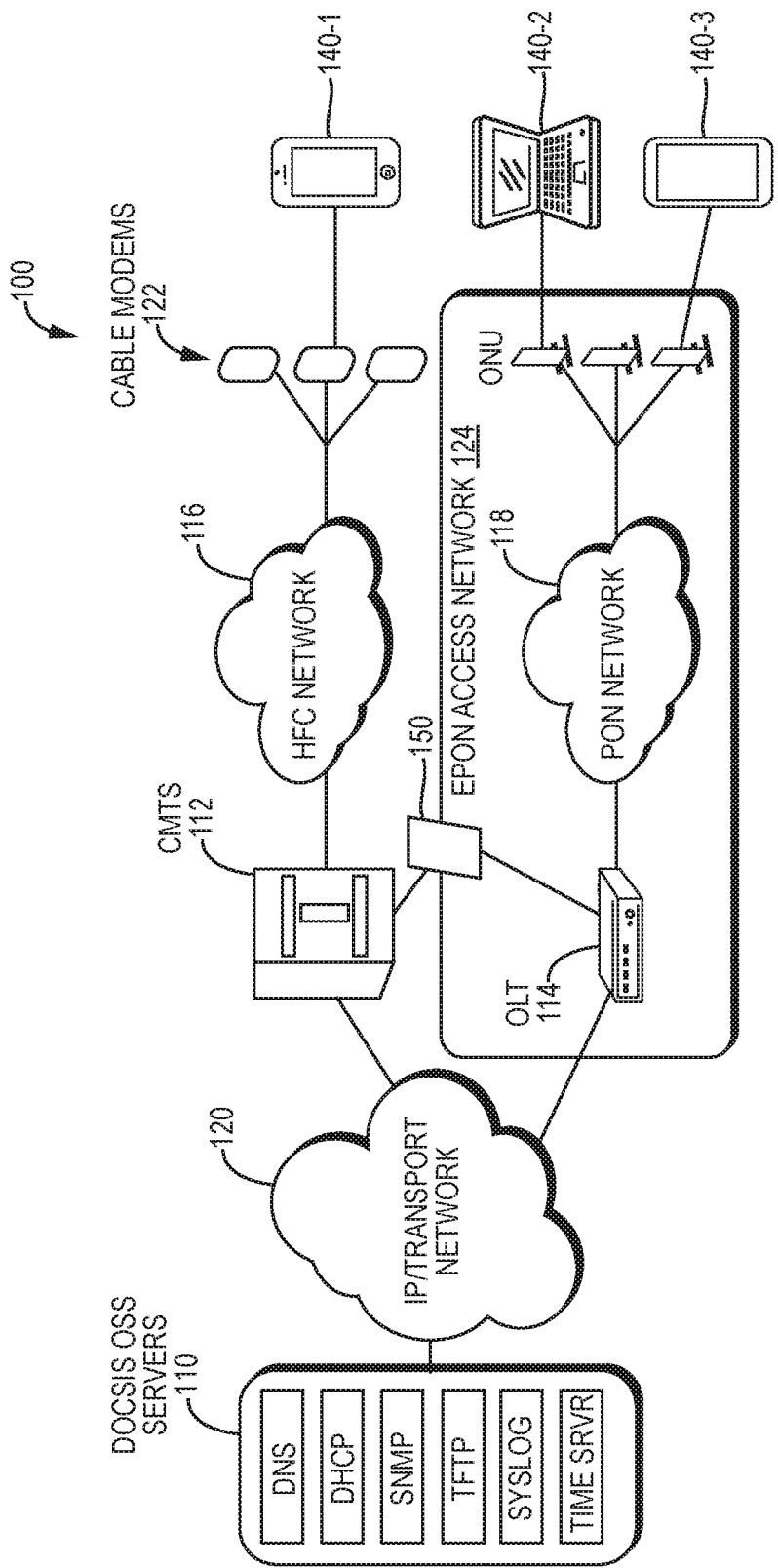
FIG. 1 is a context diagram of a wireless data service environment suitable for use with configurations herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a service provider infrastructure delivers network connectivity, typically in the form of media content and Internet browsing, based on a quantity of bandwidth delivered. The bandwidth is simply a quantity of data transmitted to (and optionally from) a subscriber device or devices over a broadband or other public access network. Typically a delivery speed is also associated with the delivered bandwidth, which is often incorporated into the delivered quantity and is usually resolved by minor delays or quality degradation not tracked or recorded by the service provider. Each user is therefore primarily tracked by a delivered bandwidth, and availability or overage of data usage computed based on a bandwidth consumption limit.

Configurations herein purport to manage usage of the broadband network by subscribers who tend to exceed data usage rate, generally according to a geographic (city, region), temporal (day, week, month), or physical delivery mode (distribution hub, CMTS (Cable Modem Termination System), fiber node or amplifier. A general approach measures data usage by a subscriber (user) in comparison to neighboring users while taking into consideration real-time usage and possible transient signal impairments within the system. The proposed approach allows a subscriber additional bandwidth when neighboring subscribers in the vicinity (hub, node) do not consume much data and the network is otherwise unencumbered. Conversely, when data usage is high or there are signal impairments, subscribers are informed of possible limitation to continuous data consumption, such as overage charges or throttling/reduction in delivery speed.

Subscribers in a broadband provider network share a common network infrastructure while often consuming data at vastly different rates. At the same time, overall data usage across the network generally increases over time as bandwidth-hungry uses and applications, such as video streaming platforms and multi-user video games, continue to rise in popularity. It would be beneficial to more effectively manage bandwidth and provide better service to the average user, but also meet the needs of high-usage subscribers. Configurations discussed below employ Internet Protocol Detail Record (IPDR) recorders and Simple Network Management Protocol (SNMP) pollers to collect data usage metrics for individual subscribers. The back-office systems will compare current real-time usage to the data consumption in the vicinity of the subscriber, and based on the current usage will either allow additional data consumption or inform the subscriber about additional charges, for example. The system may also switch high-usage subscribers to different downstream channels with additional available bandwidth.

FIG. 1 is a context diagram of a wireless data environment suitable for use with configurations herein. Referring to FIG. 1, in a broadband provider network 100, a server 110 such as a DOCSIS (Data Over Cable Service Interface Specification) server provides broadband data services (data) over an IP transport network 120 such as the Internet. Data is received by either a CMTS (Cable Modem Termination System) 112 or OLT optical line terminal (OLT) 114, and transmitted to a user over a Hybrid Fiber-Coax (HFC) network 116 or passive optical network (PON) 118, respectively. The depicted approach may also use wireless connections between cable modems or ONU and other user devices, and/or may employ ethernet cable to connect to digital media streamers like Roku, gaming consoles, smart TV etc. Other suitable bandwidth delivery mediums, such as DSL (Digital Subscriber Line), satellite, wireless and broadband over powerline may also be employed for apportioning and tracking bandwidth provided to subscribers. Subscribers receive services in the form of the transmitted data via a cable modem 122 or optical network unit (ONU) 124 corresponding to a subscriber domain. Each of the subscriber domains correspond to user devices 140-1 . . . 140-3 (140 generally) responsive to a user for providing bandwidth services through the conveyed data. User devices 140 include network conversant devices as such as phones, TVs, laptops and tablets of individual users receive the data for use or rendering by the device 140. Various devices may connect to and invoke the broadband services as consumers of bandwidth, such as media streaming devices, gaming consoles, and a multitude of IoT (Internet of Things) devices including sensors, cameras and actuators. Service providers are often most concerned with wireless bandwidth, as delivery of cellular data is typically more expensive than wired Internet transmission, however either may be the subject of the data consumption limit as disclosed herein.

In the provider network 100, a bandwidth management device 150 or application therein monitors conveyance of data to multiple subscriber domains, each serving one or more devices 140, in the provider network 100. Each respective subscriber domain of the multiple subscriber domains is assigned a data consumption limit for which the respective subscriber domain is able to retrieve within a predetermined time duration or service interval. The CMTS 112, OLT 114, or other network server is responsive to the bandwidth management device 150 for dynamically adjusting the data consumption limit based on an amount of data conveyed to the multiple subscriber domains during the monitoring, as now described in further detail below. The bandwidth management device 150 may be a separate connected device having an interface to the provider network 100, an application launched and executed in a device already employed for bandwidth transmission, or other suitable deployment.

Figure 2:
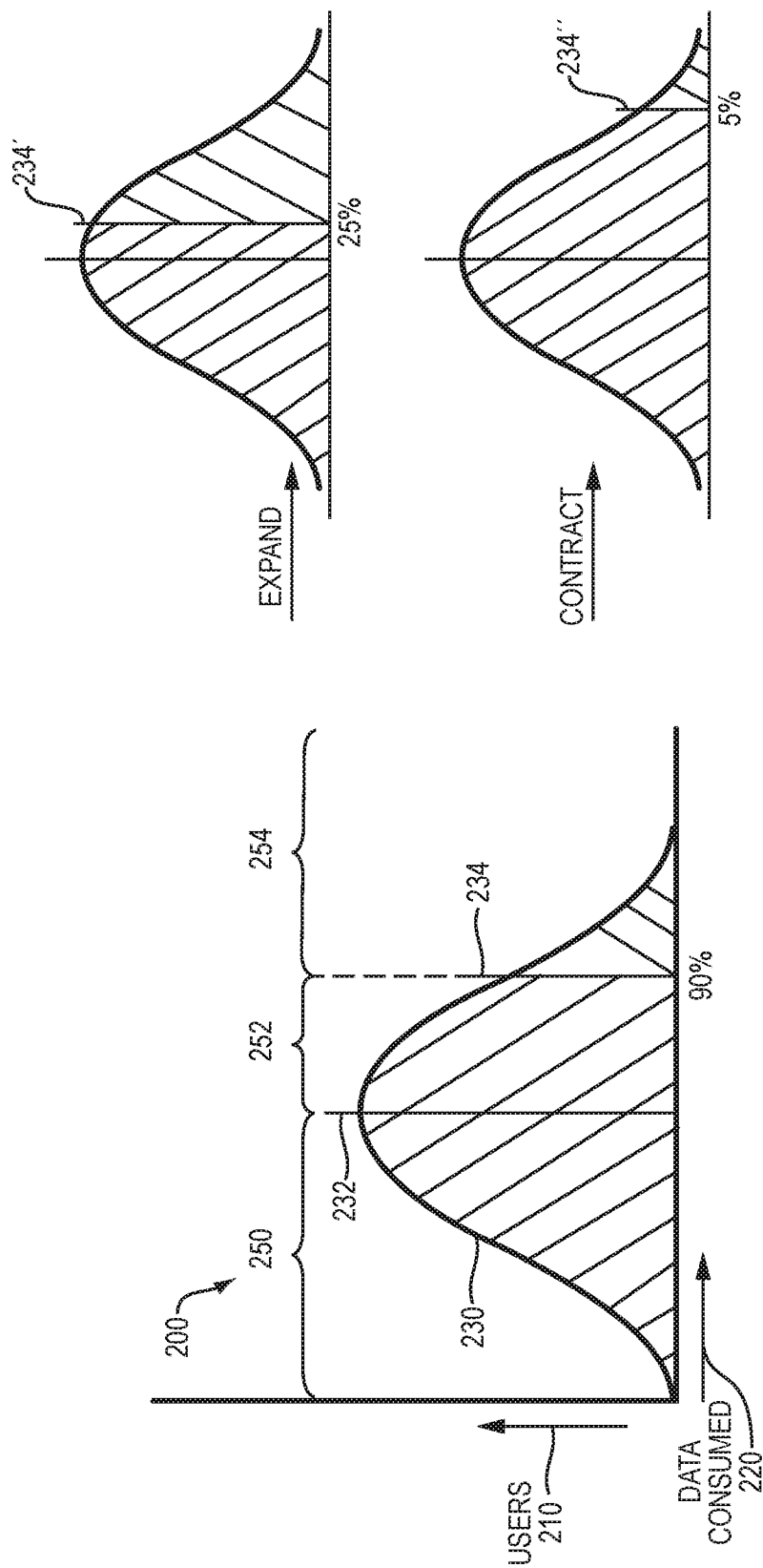
FIG. 2 shows a distribution of bandwidth usage levels in the environment of FIG. 1.

FIG. 2 shows a distribution of bandwidth usage levels in the environment of FIG. 1. Referring to FIGS. 1 and 2, in the provider network 100, a graph 200 depicts the number of users/devices 210 to data consumed 210. A bell curve 230 results around a statistical average usage 232 value for all of the subscriber domains in the measured area (hub, CMTS, OLT, or other grouping). It can be observed that a low usage region 250 defines users exhibiting an average or less than average usage pattern. A moderate usage region 252 defines users consuming an average amount up to a threshold 234 showing a $90^{th}$ percentile of usage. A high usage region 254 defines users in the top 10% of data used (per user). The determined average usage is determined based on a plurality of subscriber domains in a grouping defined by at least one of a geographic area, network device or head end for which the data is conveyed, such as all users from the server 110 or all users off the CMTS 112, for example. The bandwidth management device 150 is operable to track and compute bandwidth usage for any suitable group of subscribers and determine an average usage 232 as well as users in the high usage region 254 based on a given threshold 234 value. Various studies and analysis demonstrate that the top tier users depicted by the high usage region 254 consume a vastly greater amount of bandwidth than the remaining users.

The high usage region 254 may be expanded or contracted by varying the threshold 234 value. For example, the high usage region 254 may be expanded by changing the threshold 234' to 25% denoting the top 25% of high bandwidth users. Alternatively, the high usage region 254 may be contracted by moving the threshold 234" to the right to denote the top 5% of user as within the high usage region 254. Various reasoning and analysis may be employed to identify an appropriate user percentage for the high usage region 254. Establishment of a data consumption limit or threshold based on this percentage can demarcate which users to issue overage warnings, charges, or outright reductions in service speed to. Alternatively, users below this threshold, or alternatively those in the low usage region 250 may be allotted additional bandwidth. In contrast to conventional approaches, the threshold 234 varies based on the overall average usage and consideration of a relative size of the "heavy user" group, i.e. which users receive warnings/overage messages.

Consider that in a typical provider network, the total quantity of bandwidth resources is not fixed, but rather changing, and generally increasing as providers add additional resources to accommodate newer technologies, devices, and applications. Although many customers subscribe based on a quota, or are otherwise presented with a quota, this is likely driven not by physical capacity, but by marketing. In other words, if every subscriber hit their quota, the network would still have available bandwidth; quota is designated based on marketing, not on the technological limit of the network. It follows that a quota, or data consumption limit, is to provide an incentive to high bandwidth users to reduce disproportionate data consumption. It also follows that low consuming users could benefit, or be "rewarded" based on a low usage pattern and given a higher data consumption limit.

Figure 3:
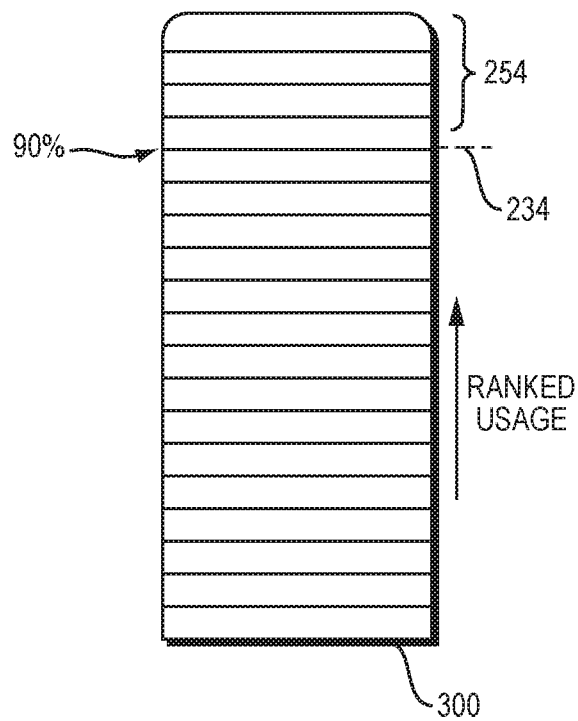
FIG. 3 shows a ranking of users according to bandwidth usage in the environment of FIG. 1.

FIG. 3 shows a ranking of users according to bandwidth usage in the environment of FIG. 1. Referring to FIGS. 1-3, consider the usage pattern of FIG. 2 where a small number of users consume most of the bandwidth. The bandwidth management device 150 identifies bandwidth consumed by each user, and determines an average usage based on a data consumption of the multiple subscriber domains. The same usage data could also be used to rank individual users in order of usage, shown by an ordering 300 of FIG. 3. The ordering 300 indicates the subscriber domains included in the high usage group 234, based on the usage threshold 234. The bandwidth management device 150 computes the data consumption limit based on the determined average usage, and may dynamically adjust the data consumption limit based on an amount of data conveyed to the multiple subscriber domains during the monitoring, such as setting the data consumption limit at 90% of the average usage. This may be further refined by either the number of users in the top n % of users, as in the ranking of FIG. 3. Alternatively, a consumed bandwidth quantity of the upper 10% where the average denotes the median consumption, would designate the high usage group 340 as users exceeding the average usage by an amount within 10% of double the average usage. For example, if the average usage is 50 GB/month, then double would be 100 GB, and those within 10% would be those over 90 GB for the month. The latter takes note that the high bandwidth user pattern may not be spread evenly or linearly, and a ranking of the top X users may be excessive. For example, in a 50 person group, say the top 4 users consume around 1000 GB, and the $5^{th}$ highest users 60 gB. A top 10% of users criteria would lump the 60 GB user with the 1000 GB users, as the top 5 users define the upper 10%.

A further consideration is based on the type of equipment and designation of certain devices and/or mediums as inherently high bandwidth even for normal usage. Accordingly, it may be reasonable to adjust the available bandwidth for a particular subscriber domain based on a media type of bandwidth traffic carried in the data conveyed. For example, modern 4K TVs require more bandwidth for rendering the same event as a conventional TV. Therefore, owners of 4K TV might be inadvertently identified as a high usage subscriber event though their device usage is commensurate. Configurations may therefore identify the media type of the bandwidth traffic, such as 4K TV streaming, and map the media type to a conversion index based on a bandwidth consumption factor indicative of a minimum bandwidth for acceptable service. In other words, the 4K TV cannot provide an acceptable user experience at a lower bandwidth. The bandwidth management device 150 would adjust the available bandwidth according to the conversion index.

Figure 4:
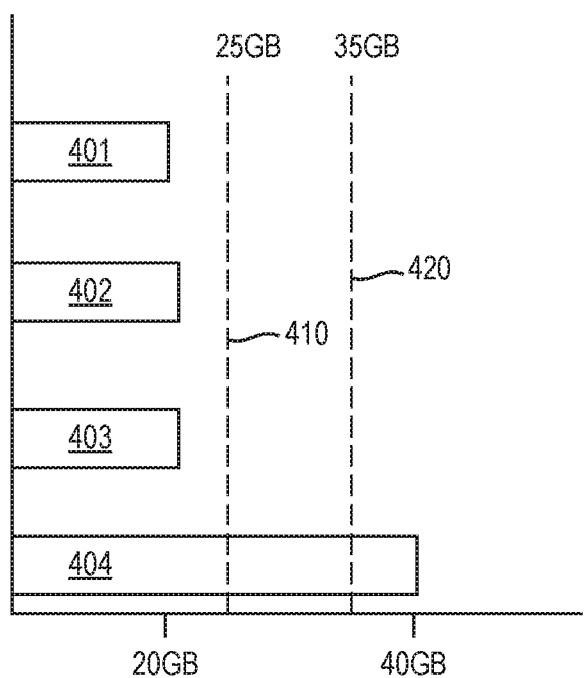
FIG. 4 shows bandwidth consumption by multiple users in the environment of FIG. 1.

FIG. 4 shows bandwidth consumption by multiple users in the environment of FIG. 1. Referring to FIGS. 1-4, the bandwidth consumption generally follows a temporal aspect of a period during which used data is tracked or counted, and then reset for a subsequent interval. FIG. 4 tracks four users invoking four subscriber domains 401, 402, 403 and 404. A predetermined time duration of one month is tracked, during which data consumption is shown. At the conclusion of the interval defined by the predetermined time duration, the bandwidth management device computes an aggregate data consumption of each subscriber domain during the interval. Subscriber domains 401, 402, and 403 each used 20 GB, while a fourth heavy user consumed 40 GB. The average consumed per subscriber domain is 25 GB, shown by dotted line 410. As referenced above, the data consumption limit does not necessarily indicate the technological limit of the equipment used. For example, if the network 100 can accommodate 35 GB/user/month, shown by dotted line 420, then subscriber domain 404, while 15 GB above the average, is only 5 GB above what the network could actually provide if every user maxed out. The remaining "excess" bandwidth (30-5 consumed by 404) means that the network 100 has a capacity to provide 25 additional GB collectively to the 20 GB users 401, 402 and 403. The bandwidth management device 150 adjusts the data consumption limit based on percentage of subscriber domains exceeding the data consumption limit during the interval. The available bandwidth based on the adjusted data consumption limit for each respective subscriber domain may be rendered to a user, screen or device corresponding to each subscriber domain, shown below in FIG. 6.

Figure 5A:
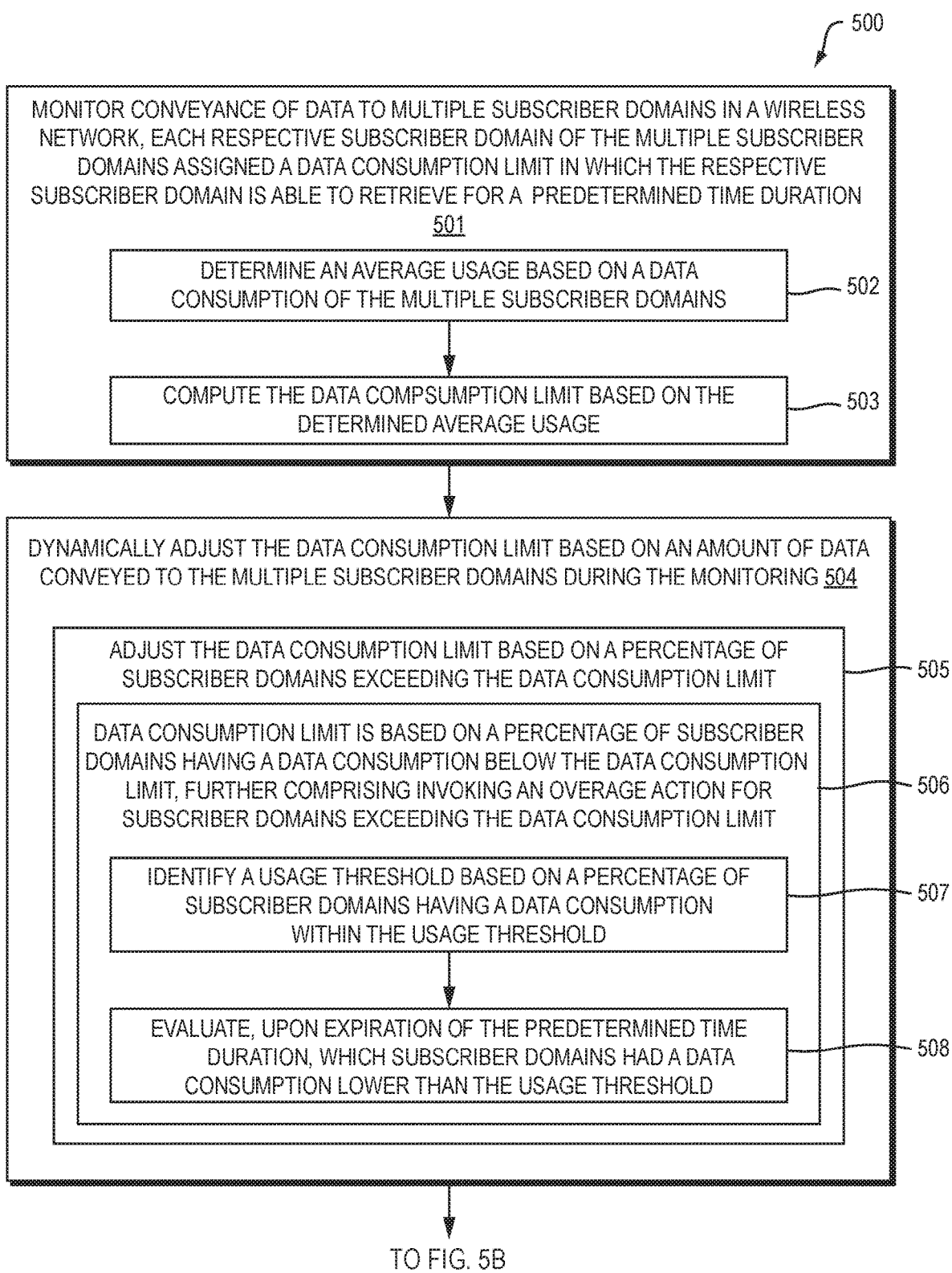
FIGS. 5A-5B show a flowchart of bandwidth limit determination in the environment of FIG. 1.
Figure 5B:
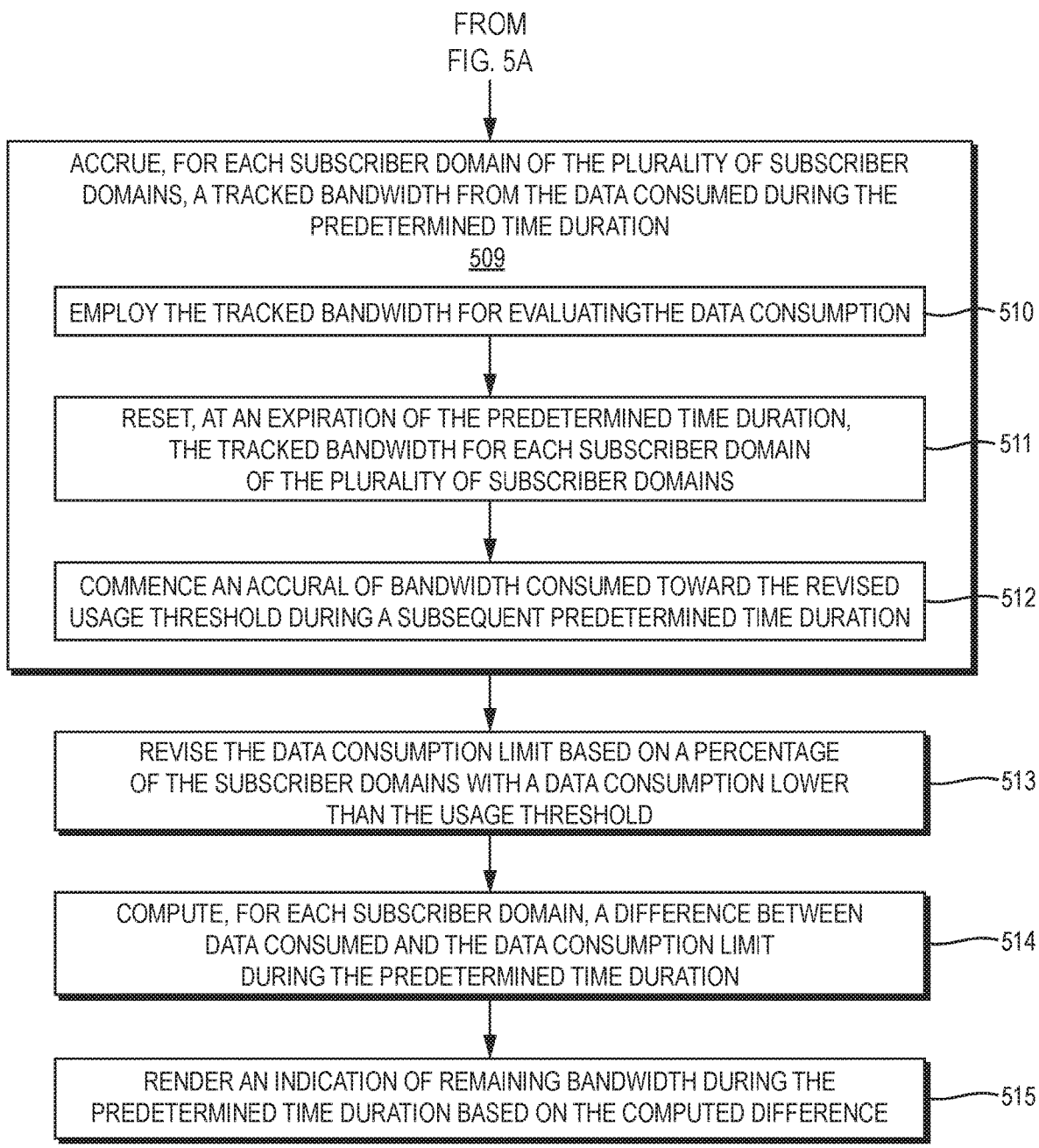

FIGS. 5A-5B show a flowchart 500 of bandwidth limit determination in the environment of FIG. 1. An exemplary sequence of steps is shown to depict the above described principles of bandwidth management by a dynamic data consumption limit based on average use, rather than fixed quotas. Other steps and or computational order may also be undertaken for implementing the above principles. Referring to FIGS. 1 and 5A-5B, at step 501, a dynamic bandwidth limit is implemented by monitoring conveyance of data to multiple subscriber domains in a provider network, such that each respective subscriber domain of the multiple subscriber domains is assigned a data consumption limit which the respective subscriber domain is able to retrieve, or consume, for a predetermined time duration. Monitoring the conveyance of data further includes determining an average usage based on a data consumption of the multiple subscriber domains, as depicted at step 502. The determined average will be employed for computing the data consumption limit based on the determined average usage, depicted at step 503 and discussed further below.

The bandwidth management device 150 dynamically adjusts the data consumption limit based on an amount of data conveyed to the multiple subscriber domains during the monitoring, as depicted at step 504. Conventional approaches employ a fixed limit, either directly or indirectly related to a network capacity, however the network is often capable of greater delivery capacity than the conventional limits or quotas suggest.

In a particular configuration, this includes adjusting the data consumption limit based on a percentage of subscriber domains exceeding the data consumption limit, as shown at step 505. As per above, the label of a "limit" is rarely indicative of an absolute capacity of the physical infrastructure, but rather a point where additional fees or throttling may be imposed. Therefore, in the example configuration, the data consumption limit is based on a percentage of subscriber domains having a data consumption below the data consumption limit, further comprising invoking an overage action for subscriber domains exceeding the data consumption limit, as depicted at step 506. As shown in FIGS. 2 and 3, demarcation of "heavy" users may be determined according to several metrics, generally resulting in a small percentage of the plurality of subscriber domains that are designated for "excessive" consumption. Generally, the overage actions include at least one of a diminution in bandwidth delivery speeds and assessment of usage charges. Bandwidth may be delivered more slowly, which might be detrimental to bandwidth intensive operations such as high definition streaming, but will still allow lower bandwidth tasks such as email to proceed.

The bandwidth management device 150 identifies a usage threshold based on a percentage of subscriber domains having a data consumption within the usage threshold (equal to or below), as shown at step 507, and evaluates, upon expiration of the predetermined time duration, which subscriber domains had a data consumption lower than the usage threshold, as depicted at step 508. Consumption is therefore periodically re-evaluated to refresh a quota or tracked data amount consumed. Any suitable interval may be employed. Monthly analysis aligns with customer billing cycles, however more frequent evaluation allows faster redistribution of bandwidth to under consuming users and helps identify short usage "spikes."

Upon completion of each interval defined by the predetermined time duration, the bandwidth management device 150 accrues, for each subscriber domain of the plurality of subscriber domains, a tracked bandwidth from the data consumed during the predetermined time duration, as disclosed at step 509. This includes employing the tracked bandwidth for evaluating the data consumption, depicted at step 510 and resetting, at the expiration of the predetermined time duration, the tracked bandwidth for each subscriber domain of the plurality of subscriber domains, as disclosed at step 511. The bandwidth management device 150 then commences an accrual of bandwidth consumed toward the revised usage threshold during a subsequent predetermined time duration, depicted at step 512, typically in a set of regularly recurring intervals.

Upon the start of the subsequent interval, the bandwidth management device 150 revises the data consumption limit based on a percentage of the subscriber domains with a data consumption lower than the usage threshold, as shown at step 513, using the consumption data and percentage determined from the previous interval. The bandwidth management device 150 computes, for each subscriber domain, a difference between data consumed and the data consumption limit during the predetermined time duration, as disclosed at step 514. Low bandwidth users may actually see their available bandwidth increase, if the overall average usage and/or the usage threshold increases.

The bandwidth management device 150 may also render an indication of remaining bandwidth during the predetermined time duration based on the computed difference of the new limit and the bandwidth consumed by each subscriber domain, as shown at step 515.

Figure 6:
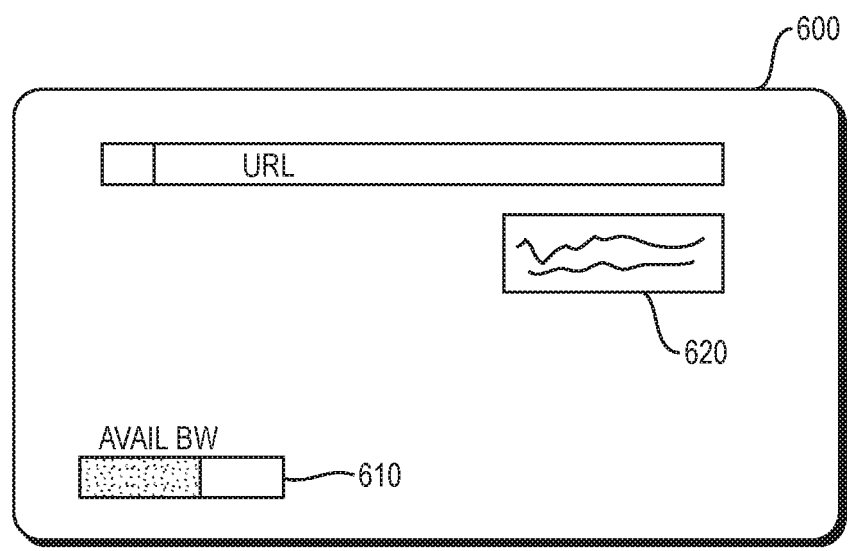
FIG. 6 shows a user interface for indicating the bandwidth limit in the environment of FIG. 1.

FIG. 6 shows a user interface for indicating the bandwidth limit in the environment of FIG. 1. Referring to FIGS. 1 and 6, a user invokes a browser screen 600 in a subscriber domain. A running tally of used bandwidth and/or available bandwidth for the current interval may be displayed in box 610. The bandwidth management device 150 computes, for each subscriber domain, a difference between data consumed and the data consumption limit during the predetermined time duration. An indication of remaining bandwidth during the predetermined time duration is rendered based on the computed difference. This value may actually increase if a new interval elapses with a higher bandwidth limit. Alternatively, a message box 620 may appear if the consumption limit has been exceeded, for indicating increased usage fees and/or reduced delivery speed, for example.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method comprising:
monitoring conveyance of data to multiple subscriber domains in a provider network defined by a service region supported by a server of a broadband provider, each respective subscriber domain of the multiple subscriber domains assigned a data consumption limit in which the respective subscriber domain is able to retrieve for a predetermined time duration;
based on the monitoring, determining an average usage based on an aggregation of data consumption of the multiple subscriber domains;
at a conclusion of an interval defined by the predetermined time duration,
evaluating an aggregate data consumption of each subscriber domain of the multiple subscriber domains during the interval, each subscriber domain corresponding to a user of network services in the service region;
determining an average usage of each subscriber domain based on the aggregate data consumption;
computing a high usage threshold based on the determined average usage of the provider network and on a percentage of subscriber domains exceeding the determined average usage; and
determining high bandwidth users based on the subscriber domains having a data consumption exceeding the high usage threshold;
reevaluating the data consumption limit of each subscriber domain based on a percentage of subscriber domains exceeding the high usage threshold during the concluded interval;
dynamically adjusting the data consumption limit of each subscriber domain based on an amount of data conveyed to the multiple subscriber domains during the interval and on whether the subscriber domain is a high bandwidth user; and
rendering, to a user corresponding to each subscriber domain, an available bandwidth based on the adjusted data consumption limit for each respective subscriber domain.

2. The method of claim 1 wherein the data consumption limit is based on a percentage of subscriber domains having a data consumption below the data consumption limit, further comprising invoking an overage action for subscriber domains exceeding the data consumption limit.

3. The method of claim 1 further comprising:
identifying a usage threshold based on a percentage of subscriber domains having a data consumption within the usage threshold;
evaluating, upon expiration of the predetermined time duration, which subscriber domains had a data consumption lower than the usage threshold; and
revising the data consumption limit based on a percentage of the subscriber domains with a data consumption lower than the usage threshold.

4. The method of claim 3 further comprising
computing, for each subscriber domain, a difference between data consumed and the data consumption limit during the predetermined time duration; and
rendering an indication of remaining bandwidth during the predetermined time duration based on the computed difference.

5. The method of claim 3 further comprising:
accruing, for each subscriber domain of the plurality of subscriber domains, a tracked bandwidth from the data consumed during the predetermined time duration;
employing the tracked bandwidth for evaluating the data consumption;
resetting, at an expiration of the predetermined time duration, the tracked bandwidth for each subscriber domain of the plurality of subscriber domains; and
commencing an accrual of bandwidth consumed toward the revised usage threshold during a subsequent predetermined time duration.

6. The method of claim 1 wherein the subscriber domains correspond to user devices responsive to a user for providing bandwidth services through the conveyed data.

7. The method of claim 2 wherein the overage actions include at least one of a diminution in bandwidth delivery speeds and assessment of usage charges.

8. The method of claim 1 further comprising, at a conclusion of an interval defined by the predetermined time duration,
evaluating an aggregate data consumption of each subscriber domain of the multiple subscriber domains during the interval;
adjusting the data consumption limit based on percentage of subscriber domains exceeding the data consumption limit during the concluded interval; and
rendering, to a user corresponding to each subscriber domain, an available bandwidth based on the adjusted data consumption limit for each respective subscriber domain.

9. The method of claim 8 further comprising adjusting the available bandwidth for a particular subscriber domain based on a media type of bandwidth traffic carried in the data conveyed.

10. The method of claim 9 further comprising
identifying the media type of the bandwidth traffic;
mapping the media type to a conversion index based on a bandwidth consumption factor indicative of a minimum bandwidth for acceptable service;

adjusting the available bandwidth according to the conversion index.

11. The method of claim 1 wherein the determined average usage is determined based on a plurality of subscriber domains in a grouping defined by at least one of a geographic area, network device or head end for which the data is conveyed.

12. The method of claim 1 wherein evaluating the aggregate data consumption further comprises:
determining a statistical average usage of the provider network; and
comparing the data consumption of each subscriber domain to the statistical average usage of the provider network.

13. The method of claim 12 further comprising allocating additional bandwidth to the usage limit for subscriber domains where the data consumption of the subscriber domain is less than the average user consumption of the provider network.

14. The method of claim 12 further comprising mitigating usage for subscriber domains where the data consumption of the subscriber domain is greater than the average user consumption of the provider network.

15. The method of claim 1 further comprising:
adjusting a data consumption limit corresponding to a first subscriber downward based on an above average data consumption of the first subscriber; and
adjusting a data consumption limit corresponding to a second subscriber upward based on a below average data consumption of the second subscriber,
the adjustment of the first subscriber and the second subscriber occurring during the same interval.

16. The method of claim 1 further comprising:
adjusting the data consumption limit for the high bandwidth users to be less than the amount of data conveyed to each respective subscriber domain during the monitoring; and
increasing the data consumption limit of subscribers having an amount of data conveyed during the monitoring to be less than the high usage threshold.

17. The method of claim 1, further comprising
computing the high usage threshold based on a percentage of users computing the most bandwidth from among the multiple subscriber domains; and
adjusting the high usage threshold based on an aggregate data consumption of each subscriber domain of the multiple subscriber domains during the interval.

18. A bandwidth management device, comprising:
an interface to a provider network for transmitting data to subscribers in fulfillment of data services;
a processor having bandwidth management logic for:
monitoring conveyance of data to multiple subscriber domains in a provider network defined by a service region supported by a server of a broadband provider, each respective subscriber domain of the multiple subscriber domains assigned a data consumption limit in which the respective subscriber domain is able to retrieve for a predetermined time duration;
based on the monitoring, determining an average usage based on an aggregation of data consumption of the multiple subscriber domains;
at a conclusion of an interval defined by the predetermined time duration,
evaluating an aggregate data consumption of each subscriber domain of the multiple subscriber domains during the interval, each subscriber domain corresponding to a user of network services in the service region;
determining an average usage of each subscriber domain based on the aggregate data consumption;
computing a high usage threshold based on the determined average usage of the provider network and on a percentage of subscriber domains exceeding the determined average usage; and
determining high bandwidth users based on the subscriber domains having a data consumption exceeding the high usage threshold;
reevaluating the data consumption limit of each subscriber domain based on a percentage of subscriber domains exceeding the high usage threshold during the concluded interval;
a controller responsive to the bandwidth management logic for dynamically adjusting the data consumption limit of each subscriber domain based on an amount of data conveyed to the multiple subscriber domains during the interval and on whether the subscriber domain is a high bandwidth user; and for
rendering, to a user corresponding to each subscriber domain, an available bandwidth based on the adjusted data consumption limit for each respective subscriber domain.

19. The device of claim 18 wherein the data consumption limit is based on a percentage of subscriber domains having a data consumption below the data consumption limit, further comprising invoking an overage action for subscriber domains exceeding the data consumption limit.

20. The device of claim 18 wherein the bandwidth management logic:
identifies a usage threshold based on a percentage of subscriber domains having a data consumption within the usage threshold;
evaluates, upon expiration of the predetermined time duration, which subscriber domains had a data consumption lower than the usage threshold; and
revises the data consumption limit based on a percentage of the subscriber domains with a data consumption lower than the usage threshold.

21. The device of claim 20 further wherein the bandwidth management logic is configured to
compute, for each subscriber domain, a difference between data consumed and the data consumption limit during the predetermined time duration; and
render, on a user device, an indication of remaining bandwidth during the predetermined time duration based on the computed difference.

22. The device of claim 20 further comprising a timer, the bandwidth management logic coupled to the timer for:
accruing, for each subscriber domain of the plurality of subscriber domains, a tracked bandwidth from the data consumed during the predetermined time duration;
employing the tracked bandwidth for evaluating the data consumption;
resetting, at an expiration of the predetermined time duration, the tracked bandwidth for each subscriber domain of the plurality of subscriber domains; and
commencing an accrual of bandwidth consumed toward the revised usage threshold during a subsequent predetermined time duration.

23. The device of claim 18 wherein the plurality of subscriber domains each correspond to user devices responsive to a user for providing bandwidth services through the conveyed data.

24. The device of claim 19 wherein the overage actions include at least one of a diminution in bandwidth delivery speeds and assessment of usage charges.

25. The device of claim 18 wherein the bandwidth management logic is responsive to the timer for, at a conclusion of an interval defined by the predetermined time duration:
- evaluating an aggregate data consumption of each subscriber domain of the multiple subscriber domains during the interval;
- adjusting the data consumption limit based on percentage of subscriber domains exceeding the data consumption limit during the concluded interval; and
- rendering, to a user corresponding to each subscriber domain, an available bandwidth based on the adjusted data consumption limit for each respective subscriber domain.

26. The device of claim 25 wherein the bandwidth management logic adjusts the available bandwidth for a particular subscriber domain based on a media type of bandwidth traffic carried in the data conveyed.

27. The device of claim 18 wherein the determined average usage is based on a plurality of subscriber domains in a grouping defined by at least one of a geographic area, network device or head end for which the data is conveyed.

28. Computer-readable storage hardware having instructions stored thereon, the instructions, when carried out by computer processor hardware, cause the computer processor hardware to:
- monitor conveyance of data to multiple subscriber domains in a provider network defined by a service region supported by a server of a broadband provider, each respective subscriber domain of the multiple subscriber domains assigned a data consumption limit in which the respective subscriber domain is able to retrieve for a predetermined time duration;
- based on the monitoring, determine an average usage based on an aggregation of data consumption of the multiple subscriber domains;
- at a conclusion of an interval defined by the predetermined time duration,
  - evaluate an aggregate data consumption of each subscriber domain of the multiple subscriber domains during the interval, each subscriber domain corresponding to a user of network services in the service region;
- determine an average usage of each subscriber domain based on the aggregate data consumption;
- compute a high usage threshold based on the determined average usage of the provider network and on a percentage of subscriber domains exceeding the determined average usage; and
- determine high bandwidth users based on the subscriber domains having a data consumption exceeding the high usage threshold
- reevaluate the data consumption limit of each subscriber domain based on a percentage of subscriber domains exceeding the high usage threshold during the concluded interval;
- dynamically adjust the data consumption limit of each subscriber domain based on an amount of data conveyed to the multiple subscriber domains during the interval and on whether the subscriber domain is a high bandwidth user; and
- render, to a user corresponding to each subscriber domain, an available bandwidth based on the adjusted data consumption limit for each respective subscriber domain.

* * * * *

UNITED STATES PATENT AND TRADEMARK OFFICE
CERTIFICATE OF CORRECTION

| | |
|---|---|
| PATENT NO. | : 11,523,002 B2 |
| APPLICATION NO. | : 16/778275 |
| DATED | : December 6, 2022 |
| INVENTOR(S) | : Stepniowski et al. |

It is certified that error appears in the above-identified patent and that said Letters Patent is hereby corrected as shown below:

On the Title Page

Item (12) delete "Stepnioski et al." and insert -- Stepniowski et al. --

Item (72) Inventor, "Lukasz Stepnioski" should read -- Lukasz Stepniowski --

Signed and Sealed this
Third Day of September, 2024

Katherine Kelly Vidal
*Director of the United States Patent and Trademark Office*